United States Patent [19]

Nagaoka

[11] Patent Number: 4,658,713
[45] Date of Patent: Apr. 21, 1987

[54] APPARATUS FOR CUTTING OFF A HEAD AND A ROOT OF BULBS

[75] Inventor: Tatsuo Nagaoka, Yokohama, Japan

[73] Assignee: Nagaokaseiki Seisakusho Co. Ltd., Kanagawa, Japan

[21] Appl. No.: 731,145

[22] Filed: May 6, 1985

[30] Foreign Application Priority Data

May 14, 1984 [JP] Japan ................... 59-94714

[51] Int. Cl.$^4$ .......................................... A23N 15/04
[52] U.S. Cl. ........................................ 99/636; 83/409; 99/491
[58] Field of Search .............. 99/491, 636; 83/433, 83/435.2, 425.2, 435.1, 884, 409, 425.4, 428

[56] References Cited

U.S. PATENT DOCUMENTS 3,402,748  9/1968  Olney ........................ 99/636
3,765,320 10/1973  Van Raay ................... 99/636

FOREIGN PATENT DOCUMENTS 45780 11/1977 Japan .

Primary Examiner—Donald R. Schran
Attorney, Agent, or Firm—Lowe Price LeBlanc Becker & Shur

[57] ABSTRACT

A first and a second leading member are disposed in opposite relation with one another and are supported for movement in a direction axially of a cutting apparatus. A first and a second cutter are supported for movement integral with the respective leading members and are disposed in opposite relation with one another and at locations downstreams of the leading members in a direction transversely of the apparatus and closer to the bulb to be cut than the leading member in the direction axially of the apparatus. The leading members move toward one another and the respective cutters are rotatably driven by motors. The leading members are adapted to abut against the bulb, to be displaced away from one another by the bulb so as to cause the cutters to assume their desired positions for a cutting operation.

6 Claims, 6 Drawing Figures

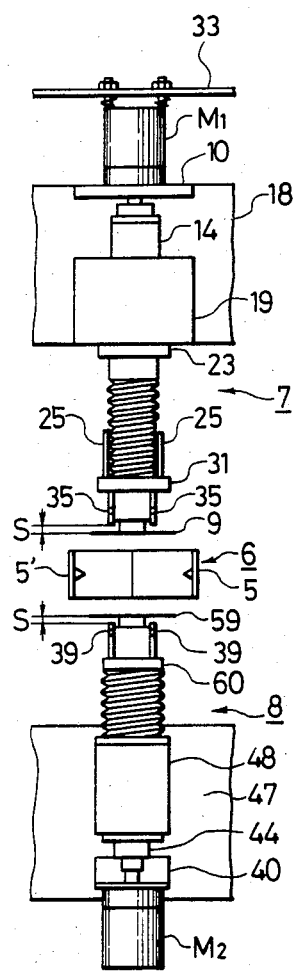
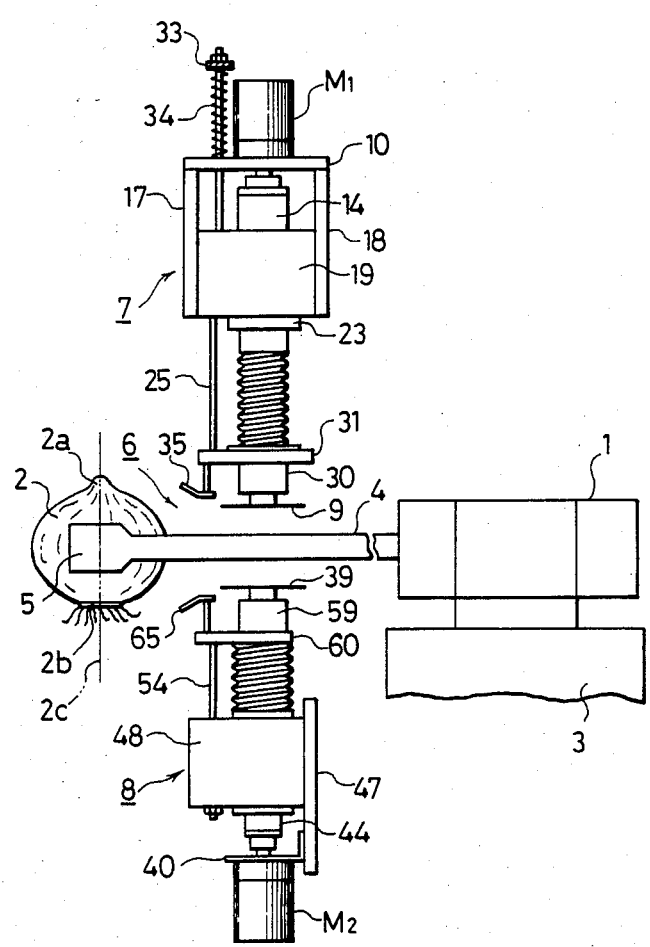

APPARATUS FOR CUTTING OFF A HEAD AND A ROOT OF BULBS

BACKGROUND OF THE INVENTION

1. Field of the Invention

The present invention relates to an apparatus for cutting off a head and a root of bulbs uniformly and simultaneously.

2. Description of the Prior Art

Generally, in fine cutting of bulbs such as an onion, garlic, scallion and the like which have been widely used as cooking materials, it is necessary to cut off beforehand opposite end portions, i.e., a head and a root of the bulbs from a main portion thereof. Accordingly, in effecting such treatment to a large number of bulbs, it is necessary to use mechanical measures. However, using a conventional cutting unit equipped with cutters operable only at fixed positions for cutting off the opposite end portions of the bulbs simultaneously is impractical, since the bulbs vary in size and configuration. Such a cutting operation results in unsatisfactory cutting of the bulbs and produces a loss of useful portions thereof. Insufficient cutting, on the other hand, requires a supplemental cutting operation performed mechanically or manually, and results in considerable decrease in productivity due to difficulty in separating the insufficiently cut bulbs from properly cut bulbs.

Conventionally, to resolve the above-mentioned problem, an advanced type of cutting unit has been proposed in Japanese Patent Publication No. 45780/1977, for instance. This proposed cutting unit comprises: a supporting/guiding member openable upwardly and downwardly and adapted to support a bulb; a taking in-and-off means for actuating the supporting/guiding member toward and away from a cutting operation area of the unit; a clamping means for clamping the bulb in a direction vertically of supporting/guiding member and operable in a manner synchronized with the supporting/guiding member, to be moved from an upstream side to a downstream side of the cutting operation area; and a cutter changeable in phase between positions opposite upper and lower ends of the bulb in the cutting operation area in a direction along which the bulb is moved, for sequential cutting off of the head and root of the bulb. According to conventional cutting unit of this kind, the bulb must be moved by the clamping means to a position where the head of the bulb is cut by the cutter, changed in its phase after cutting off the root of the bulb. Therefore, the conventional unit is complicated in construction and operation and high in cost.

SUMMARY OF THE INVENTION

An object of the present invention is to provide an apparatus for uniformly and simultaneously cutting off a head and a root of a bulb, regardless of variations of bulb size and bulb configuration, thereby avoiding both excessive cutting and insufficient cutting and the need to separate insufficiently cut bulbs from other cut bulbs, thereby improving productivity in the cutting operation.

Another object of the invention is to provide an apparatus for cutting off a head and a root of a bulb, which is simple in construction and operation and low in cost.

According to the present invention, an apparatus for cutting off a head and a root of a bulb comprises leading means having a first and a second leading member, which are disposed in opposite relation with one another and for movement toward and away from one another in a direction axially of the apparatus. A first and a second cutter, forming cutter means, are disposed in opposite relation with one another and at locations downstream of the leading members in a direction transversely of the apparatus. Further, each of the cutters is positioned closer to the bulb to be cut than a corresponding one of the leading members by a predetermined distance in the axial direction of the apparatus. Each of the cutters is supported for rotation and for movement in unison with the correponding leading member. The first and the second leading members are urged by urging means so that they are displaced toward one another. Further, the cutters are rotatably driven by driving means, and the leading members are adapted to abut against the bulb, to be displaced away from one another by the bulb to cause the cutters to assume their locations for the cutting operation.

BRIEF DESCRIPTION OF THE DRAWINGS

FIG. 1 is a fragmentary front view showing an apparatus for cutting off a head and a root of an onion according to an embodiment of the present invention;

FIG. 2 is a side view showing the apparatus of FIG. 1 in a state the onion is held by grasping plates;

DETAILED DESCRIPTION

Figure 3:
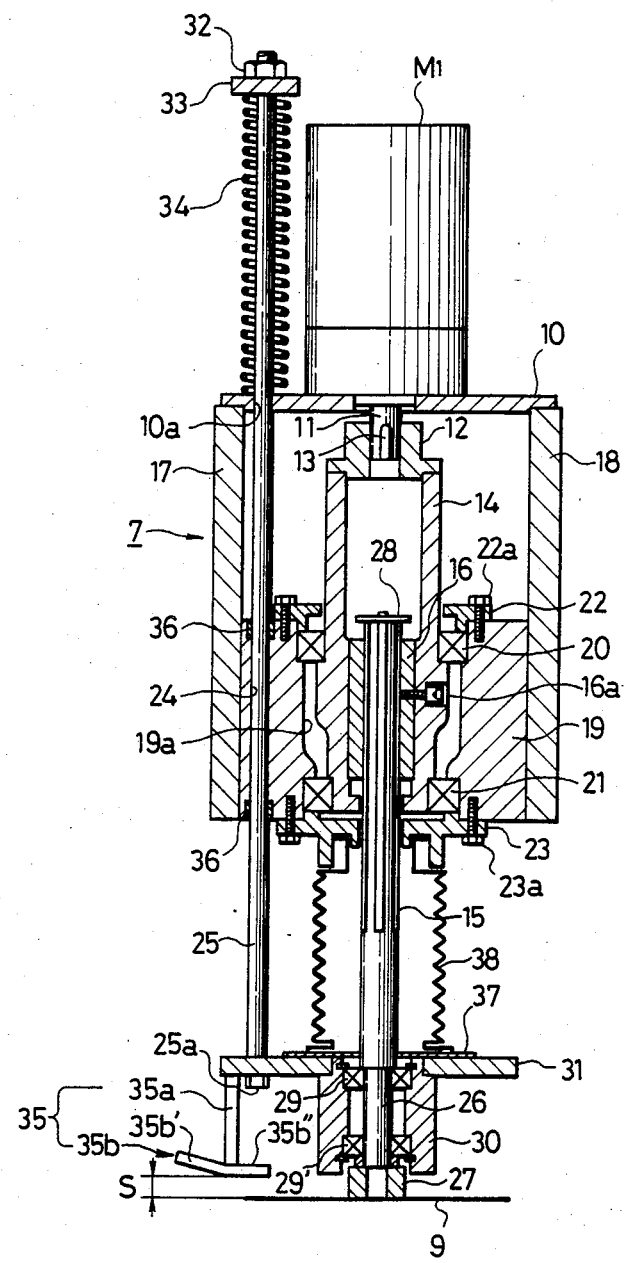
FIG. 3 is an enlarged front view showing the head-cutting unit shown in FIG. 1.

A preferred embodiment of the present invention will now be explained in detail with reference to the accompanying drawings.

In FIGS. 1 through 4 showing an apparatus 6 for cutting off a head 2a and a root 2b of an onion 2, the reference numeral 1 designates a cylinder for grasping and transferring the onion 2. The cylinder 1 is secured on a stationary bed 3 and is provided with a piston rod 4 adapted to be actuated by the cylinder 1 for reciprocal movement in the horizontal direction or the direction transversely of the apparatus 6 along which the onion 2 is transferred. The rod 4 is formed at its tip end portion with a pair of grasping plates 5, 5'. These plates 5, 5' are adapted to grasp opposite sides of the onion 2 held by a centering apparatus (not shown) in a manner such that the vertical center thereof is kept at a prescribed level, with the head 2a and the root 2b thereof directed upwardly and downwardly. A centering apparatus of this kind has been proposed, for instance, in U.S. Ser. No. 709,201 filed on Mar. 7, 1985 by the present applicant.

The cutting apparatus 6 further includes a head-cutting unit 7 arranged on an upper side of the apparatus and a root-cutting unit 8 arranged on a lower side in a manner facing or opposite the former unit 7. In FIG. 3 showing the head-cutting unit 7, a first motor M1 is mounted on a motor mounting plate 10 secured to upper stationary plates 17, 18 for rotatably driving a head-cutting cutter 9, the cutting plane of which extending horizontally. The motor has its output shaft 11 connected to a joint 12 by means of a key 13. The joint 12 in turn is fittedly secured by a bolt, not shown, to an upper portion of a hollow shaft 14 disposed coaxially of the output shaft 11. A spline shaft 15 extends in a coaxial relation with the output shaft 11 of the motor M1 in the interior of the hollow shaft 14, to which a spline-fitting body 16 is integrally fixed by a bolt 16a in engagement with the spline shaft 15 in a manner preventing relative rotation thereof but permitting relative axial movement.

The reference numeral 19 designates an upper supporting body which is fixedly interposed between respective lower half portions of the upper stationary plates 17, 18, and is formed therein with a through hole 19a. The hollow shaft 14 extends through the through hole 19a and is rotatably supported on the supporting body 19 through radial ball bearings 20, 21. These bearings are retained in the body 19 by means of an upper and lower covers 22, 23 secured to opposite sides of the body 19 by bolts 22a, 23a, respectively. The reference numeral 24 designates one of the through holes (only one of which is shown in FIG. 3) formed in the supporting body 19 and extending parallel with the spline shaft 15. The respective holes 24 slidably receive guide rods 25 (only one of which is shown) which extend in parallel with the spline shaft 15.

The shaft 15 is provided at its upper end with a ring 28 for preventing the shaft 15 from dropping out and is provided at its lower end with a boss 27 for attachment of the head-cutting cutter 9 via a supporting shaft 26. Since the spline shaft 15 is slidable upwardly and downwardly, the cutter 9 attached to the boss 27 is also movable upwardly and downwardly. Further, the supporting shaft 26 is rotatably supported by an upper bearing stand 30 through bearings 29, 29' received therein. An upper portion of the stand 30 is integrally fittedly secured to a mounting plate 31 to which guide rods 25 are affixed at their respective lower ends by nuts 25a (only one of which is illustrated) for upward and downward movement in unison with the mounting plate 31.

An intermediate portion of each of the guide rods 25 is slidably received in a corresponding one of through holes 10a (one of which is illustrated) formed in the motor mounting plate 10 and the corresponding through hole 24 formed in the supporting body 19 in alignment with the hole 10a. Around an upper portion of the guide rod 25 is fitted a compression coil spring 34 constantly urging the mounting plate 31 through the rod 25 so as to restore the plate 31 to its rest position. The spring 34 is interposed between a stopper 33 and the mounting plate 10, the axial position of the stopper 33 being restricted or determined by a nut 32 threadedly fitted on an upper threaded portion of the guide rod 25, the setting load of the spring 34 can be adjusted by means of the nut 32.

The reference numerals 35, 35 designate a pair of leading plates as leading member, which are adapted to determine the vertical position of the cutting plane of the cutter 9 and are disposed in alignable or parallel with each other. Each leading plate 35 has a supporting rod 35a secured to a lower surface of the mounting plate 31, and a guide portion 35b formed integrally with a tip portion of the rod 35a. The guide portion 35b has a first half 35b' located on the upstream side thereof in the direction of transfer of the onion 2 and obliquely upwardly extending, and a second half or horizontal portion 35b'' formed integrally with the first half and located on downstream side of the guide portion 35b and extending horizontally or in parallel with the cutting plane of the cutter 9. The cutter 9 is separated by a predetermined distance S from the horizontal portion 35b'' toward the onion 2 to be cut in the direction axially of the unit 7. The distance S is set to a value which makes it possible to cut off the head portion 2a of the onion 2 by a substantially constant desired length L (FIGS. 5,6) irrespective of onion size and onion configuration.

The reference numerals 36, 36 designate bushing received in the through hole 24 which is formed in the upper supporting body 19, 37 a seat fixed to an upper side of the mounting plate 31 by appropriate connecting means such as bolts, not shown, and 38a is a bellows interposed between the lower cover 23 and the seat 37 in a manner surrounding the spline shaft 15 for preventing intrusion of chips of the onion 2 into sliding surfaces of the spline shaft 15. This bellows is formed of elastic material such as rubber and is thus expandable and contractable along its axial direction.

Further, in order to reduce frictional force exerted between the body 19 and the guide rod 25, rolling bearings (not shown) may be axially slidably mounted therebetween.

Figure 4:
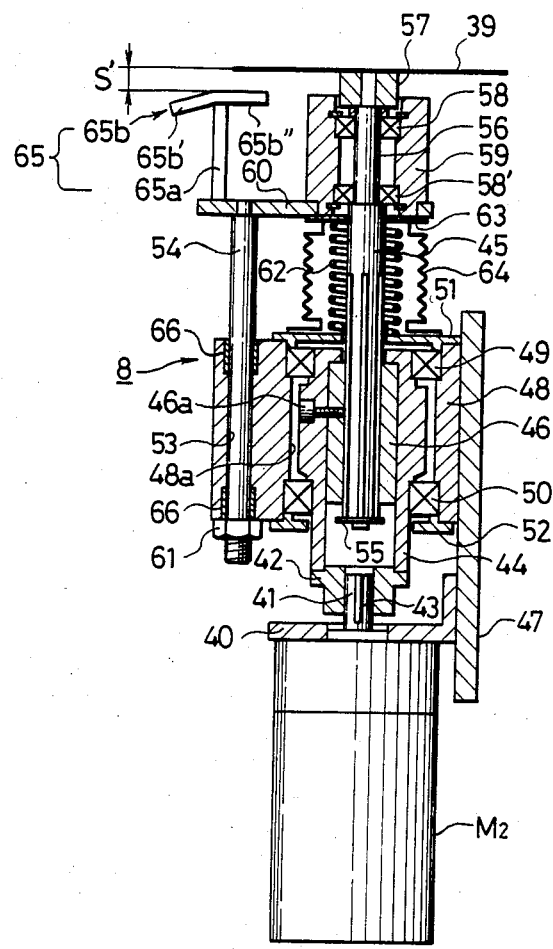
FIG. 4 is an enlarged front view showing the root-cutting unit shown in FIG. 1.

As shown in FIG. 4, in the root-cutting unit 8, a second motor M2 is mounted on a bottom surface of a motor mounting plate 40 for rotatably driving a root-cutting cutter 3 for cutting off the root 2b of the onion 2, the cutting plane of the cutter 3 extending horizontally or in the direction transversely of the unit 8 along which direction the onion 2 is transferred. The motor M2 has its output shaft 41 connected to a joint 42 by means of a key 43. The joint 42 in turn is fittedly secured to a lower end of a hollow shaft 44 by means of a bolt, not shown. In the interior of the hollow shaft 44 a spline shaft 45 extends in alignment with the spline shaft 15 of the head-cutting unit 7. A spline-fitting member 46 is integrally affixed by a bolt 46a to the hollow shaft 44 and is arranged in engagement with the spline shaft 45. The above-mentioned motor mounting plate 40 is secured to a lower side portion of a lower stationary plate 47.

The reference numeral 48 denotes a lower supporting body fixed to a side portion of the stationary plate 47. The hollow shaft 44 is received in a through hole 48a formed in the supporting body 48 and is rotatably supported by the body 48 via radial ball bearings 49, 50 retained therein by means of upper and lower covers 51, 52, respectively, which are fixed to an upper and lower end surfaces of the supporting body 48 by bolts, not shown. The reference numeral 53 denotes one of through holes (only one of which is shown) formed in the lower supporting body 48 in parallel with the spline shaft 45 to receive a corresponding one of elongated guide rods 54 (only one of which is shown.)

The spline shaft 45 extends coaxially of the output shaft 41 of the motor M2 and engages the spline-fitting member 46 in a manner slidable upwardly and downwardly relative thereto and rotatable integrally therewith. The spline shaft 45 is provided at its lower end with a stopper 55 for preventing the shaft from dropping out and is provided at its upper end, via a supporting shaft 56, with a boss 57 for attachment of a root-cutting cutter 39 so that the cutter 39 is displaceable upwardly and downwardly upon sliding movement of the shaft 45. Further, the cutter 39 is disposed in opposite relation with the cutter 9, as shown in FIG. 1. The supporting shaft 56 is rotatably supported by a lower bearing stand 59 via bearings 58, 58' retained therein, and is fittedly secured at its lower portion to a mounting plate 60 to which is fixed upper ends of the guide rods 54 each having a lower half portion inserted in the through hole 53 formed in the lower supporting body 48, and a lower end threadedly engaged with a nut 61.

The reference numeral 62 designates a compression coil spring fittedly mounted around the spline shaft 45, with its opposite ends abutted against the upper cover 51 and a seat 63 secured to the bottom end surface of the mounting plate 60, respectively. The spring 62 serves as urging means for restoring the root-cutting cutter 39 via the mounting plate 60 to its rest position after cutting operation thereof. The setting load of the spring 62 can be adjusted by the nut 61. The reference numeral 64 designates a bellows arranged around the spring 62 and formed of elastic material such as rubber so as to be expandable and contractable along the axis thereof.

The reference numerals 65, 65 designate a pair of leading plates extending in parallel with one another and are adapted to determine a vertical position of the cutting plane of the cutter 39. Each of the leading plates 65, 65 has a supporting rod 65a secured to an upper surface of the mounting plate 60, and a guide portion 65b integrally formed with a tip portion of the rod 65a and having an outer half portion 65b' extending obliquely downwardly. The cutter 39 is separated from an upper surface of a horizontal portion 65b'' of the leading plate 65 by a predetermined distance S' which is determined in relation to a desired cutting-off amount L' (FIGS. 5,6) of the root 2b of the onion 2. The reference numerals 66, 66 designate bushings received in the through hole 53 formed in the lower supporting body 48.

As explained above, the leading plates 35, 35 and the other leading plates 65, 65 as well as the cutter 9 and the other cutter 39 are disposed in a manner facing or opposite one another and movable toward and away from one another, and are urged by the springs 34, 62 so that they become close to each other.

In the following, the operation of the cutting apparatus constructed as mentioned above will now be explained. The onion 2, which is held by the above-mentioned centering apparatus (not shown) in a manner that the vertical center thereof is at a prescribed level irrespective of onion size and onion configuration, is first transferred toward the apparatus 6, with its head 2a and root 2b directed upwardly and downwardly. Then, the onion 2 is held at its opposite sides by the grasping plates 5, 5' of the piston rod 34 on the side remote from the cylinder 1, as shown in FIG. 2. Thereafter, the cylinder 1 is actuated so that the piston rod 4 is retracted toward the cylinder 1, with the vertical position of the onion 2 kept unchanged.

Figure 5:
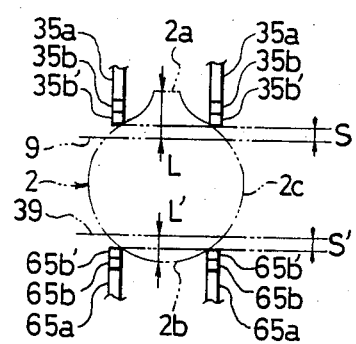
FIG. 5 is an enlarged fragmentary view showing a positional relationship between the leading members and a small onion, during a cutting operation thereof.
Figure 6:
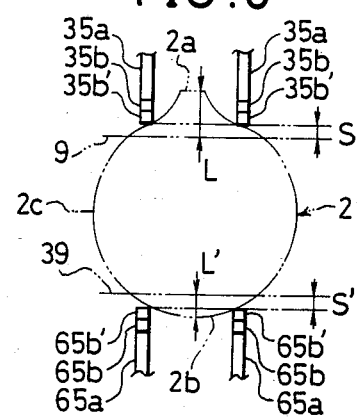
FIG. 6 is a view similar to FIG. 5 showing a state where a cutting operation on a large-sized onion is effected.

By this retractive movement of the piston rod 4, the onion 2 is transferred so that the head 2a and the root 2b of the onion are directed between the leading plates 35, 35 and between the other leading plates 65, 65, respectively, to be brought into forced contact with the guide portions 35b'', 35b''; 65b'', 65b'' of the leading plates to urge them away from one another against resilient forces exerted by the springs 34, 62. As a result, the leading plates 35, 35 and the elements movable therewith, i.e., the cutter 9, the spline shaft 15, and the guide rods 25 are displaced upwardly, while the leading plates 65, 65, the mounting plate 60, the cutter 39, the spline shaft 45, and the guide rods 54 are displaced downwardly. Such upward and downward movement of these elements continue until the opposite sides of a largest-diameter portion 2c of the onion 2 (FIG. 2) are brought into contact with the horizontal portions 35b'', 35b''; 65b'', 65b'' of the leading plates or until the leading plates reach their uppermost and lowermost positions, respectively, as shown in FIGS. 5 and 6. Thereafter, the onion 2 is subjected to a cutting operation while the leading plates are in contact with the largest-diameter portion of the onion 2. Thus, the head 2a and root 2b of the onion 2 are cut off by means of the rotating cutters 9, 39, which are disposed at locations downstream of the leading plates and closer to the onion 2 to be cut than horizontal portions 35b''', 35b''; 65b''', 65b'' of the leading plates. In order to positively prevent positional changes of the cutters during cutting operation thereof, the length of each of the horizontal portions or the leading plates is preferably set to a value such as to maintain the horizontal portions abutted against the side of the largest-diameter portion of the onion 2, while the cutting operation is effected. As is clear from FIGS. 5 and 6, the head 2a and root 2b of the onion are cut off by substantially constant desired amounts L, L' regardless of variations of onion size and onion configuration.

The cut onion is further retracted by the cylinder 1 to a position where it is out of contact with cutters 9, 39, to be detached from the grasping plates 5, 5'. When the onion 2 is out of engagement with the cutters in the above manner, the cutters are restored by the springs 34, 62 to their initial or rest positions together with the mounting plates 31, 60, etc. Thereafter, the above operation is repeatedly effected each time different onion is transferred into the apparatus 6. These cut onions may be further transferred to a peeling apparatus (not shown).

What is claimed is:

1. An apparatus for cutting off a head and a root of bulbs, comprising:
   leading means having a first and a second leading member disposed in opposite relation with one another and for abutment against said bulb to be cut, said leading members being supported for movement toward and away from one another in a direction axially of said cutting apparatus;
   cutter means having a first and a second cutter disposed in opposite relation with one another and at locations down-stream of said leading members in a direction transversely of said apparatus, each of said cutters being positioned closer to said bulb than a corresponding one of sad leading members by a predetermined distance in the axial direction of said cutting apparatus, each of said cutters being supported for rotation and for axial movement in unison with said corresponding leading member;
   urging means urging said first and second members toward one another;
   driving means for rotatably driving said first and second cutters;
   at least one mounting member provided with a bearing member and supported for movement axially of said apparatus, a corresponding one of said leading members being secured to said at least one mounting member, at least one of said cutters corresponding to said at least one mounting member being rotatably supported by said bearing member;
   at least one guide rod each having an end secured to said at least one mounting member;
   a hollow shaft having an inner periphery formed with spline-fitting portion and being drivingly coupled to said driving means;

a spline shaft having a portion extending in the interior of said hollow shaft and adapted to be engaged with said spline-fitting portion in a manner preventing relative rotation but permitting relative axial movement, said spline shaft being rotatably supported by said bearing member provided in said at least one mounting member; and a stationary member rotatably supporting said hollow shaft and axially movably supporting said at least one guide rod.

2. The cutting apparatus as claimed in claim 1, wherein said urging means includes a spring fittedly mounted around said guide rod and having opposite ends disposed in abutment against another end of said guide rod and said stationary member, respectively.

3. The cutting apparatus as claimed in claim 1, wherein said urging means includes a spring fittedly mounted around said spline shaft, said spring being interposed between said mounting member and said stationary member.

4. An apparatus for cutting off a head and a root of bulbs comprising:

leading means having a first and a second leading member disposed in opposite relation with one another and for abutment against said bulb to be cut, said leading members being supported for movement toward and away from one another in a direction axially of said cutting apparatus;

cutter means having a first and a second cutter disposed in opposite direction with one another and at locations down-stream of said leading members in a direction transversely of said apparatus, each of said cutters being positioned closer to said bulb than a corresponding one of said leading members by a predetermined distance in the axial direction of said cutting apparatus, each of said cutters being supported for rotation and for axial movement in unison with said corresponding leading member;

urging means urging said first and second members toward one another;

driving means for rotatably driving said first and second cutters;

wherein each of said leading members has a pair of leading plates extending in parallel with each other, said bulb being transferred to be directed between said leading plates, and each of said leading plates has a guide portion adapted to abut against said bulb, said guide portion having a first half and a second half which are located on the upstream side and the downstream side in the direction of transfer of said bulb, respectively, said first half obliquely outwardly extending away from a corresponding one of said first and second cutters, said second half being formed integrally with said first half and extending in parallel with a cutting plane of said corresponding cutter which extends along the direction of transfer of said bulb.

5. The cutting apparatus as claimed in claim 4, wherein the length of said second half of said guide portion is set to a value enough to maintain said second half abutted against a side of a largest-diameter portion of said bulb while said bulb is being cut.

6. An apparatus for cutting off a head and a root of bulbs comprising:

leading means having a first and a second leading member disposed in opposite relation with one another and for abutment against said bulb to be cut, said leading members being supported for movement toward and away from one another in a direction axially of said cutting apparatus;

cutter means having a first and a second cutter disposed in opposite relation with one another and at locations down-stream of said leading members in a direction transversely of said apparatus, each of said cutters being positioned closer to said bulb than corresponding one of said leading members by a predetermined distance in the axial direction of said cutting apparatus, each of said cutters being supported for rotation and for axial movement in unison with said corresponding leading member;

urging means urging said first and second members toward one another;

driving means for rotatably driving said first and second cutters;

transfer means for transferring said bulb toward said leading means and then said cutter means along the direction transversely of said apparatus; and wherein said transfer means has a piston rod having grasping plates for grasping said bulb, and a cylinder for actuating said piston rod for reciprocal movement in the direction of transfer of said bulb.

* * * * *